US006312827B1

(12) United States Patent
Horst

(10) Patent No.: US 6,312,827 B1
(45) Date of Patent: Nov. 6, 2001

(54) PRE-IMPREGNATED PRODUCT AND ITS EMPLOYMENT IN MANUFACTURE OF DECORATIVE COMPOUND STRUCTURES

(75) Inventor: Matscheko Horst, Ettlingen (DE)

(73) Assignee: Koehler decor GmbH & Co. KG (DE)

( * ) Notice: Subject to any disclaimer, the term of this patent is extended or adjusted under 35 U.S.C. 154(b) by 0 days.

(21) Appl. No.: 09/548,144

(22) Filed: Apr. 13, 2000

(30) Foreign Application Priority Data

Jul. 2, 1997 (DE) .............................................. 197 28 250

(51) Int. Cl.[7] ........................... B32B 29/00; B32B 27/10; C08F 220/06

(52) U.S. Cl. ....................... 428/507; 428/474.4; 428/513; 428/514; 524/521

(58) Field of Search ..................................... 428/503, 507, 428/514, 513, 474.4; 427/391; 524/521; 162/135, 164.1, 168.3, 168.1, 184

(56) References Cited

U.S. PATENT DOCUMENTS

| | | | |
|---|---|---|---|
| 4,294,873 | 10/1981 | Hartmann et al. | 427/391 |
| 4,321,175 | 3/1982 | Schmidt et al. | 524/555 |
| 4,324,832 | 4/1982 | Moroff et al. | 428/289 |
| 5,824,190 * | 10/1998 | Guerro et al. | 162/135 |
| 5,851,684 | 12/1998 | Matscheko et al. | 428/537.5 |

FOREIGN PATENT DOCUMENTS

| | | |
|---|---|---|
| 2854491 | 6/1980 | (DE) . |
| 29 03 172 C2 | 7/1980 | (DE) . |
| 0 223 922 | 6/1987 | (DE) . |
| WO9400523 | 1/1994 | (WO) . |
| WO 9708384 | 3/1997 | (WO) . |

* cited by examiner

*Primary Examiner*—Harold Pyon
*Assistant Examiner*—Elena Tsoy
(74) *Attorney, Agent, or Firm*—Fay, Sharpe, Fagan, Minnich & McKee, LLP

(57) ABSTRACT

Described is a method for manufacture of a pre-impregnate, characterized in that a base paper is impregnated with an impregnation solution, which contains:

a) a watery dispersion on basis of an acrylic acid ester/styrol-copolymer, b) a dry hardener on basis of a copolymerisate from (meth)acrylamide and (meth)acrylic acid, and c) water whereby per weight part of dry copolymerisate from (meth) acrylamide and (meth)acrylic acid, approximately 0.3 to 13 parts by weight of dry acrylic acid ester/styrol-copolymer are employed. The pre-impregnate obtained with the method serves for fabrication of decorative compound structures, such as decorative laminates and different furniture components.

6 Claims, No Drawings

PRE-IMPREGNATED PRODUCT AND ITS EMPLOYMENT IN MANUFACTURE OF DECORATIVE COMPOUND STRUCTURES

FIELD OF THE INVENTION

The present invention relates to a method for manufacture of a pre-impregnated product, to the pre-impregnated product obtained with the method, including its employment in the fabrication of decorative compound structures. The invention also relates to the impregnation solution used for impregnating the pre-impregnated product.

BACKGROUND OF THE INVENTION

It is known that decorative laminates and pieces of furniture can be produced by coating particle boards with impregnated decorative papers. A crucial role is played by the impregnated paper, which is obtained by impregnating a basic paper with a specific impregnation solution or an impregnation resin. The impregnated paper is identified in this instance as pre-impregnated product and serves also as decoration-carrying component in the named applications.

A method of the initially described type is apparent from EP 0 223 922. This patent describes method for manufacture of widths of paper impregnated with synthetic resins in the form of solutions and dispersions. As impregnation fluid, a mixture is used of watery anionic copolymer dispersions on basis of acrylic acid, acrylic acid ester, acrylic nitrile, vinyl acetate and/or styrol and of watery anionic solutions of copolymerisates on basis of maleic anhydride or maleic acid with styrol, acrylic acid and acrylic acid esters.

WO 94/00523 discloses a watery impregnation solution, with which papers are impregnated, which are then used to manufacture laminated boards. The watery impregnation solution contains 5 to 90 parts by weight of polyvinyl alcohol on 10 to 95 parts by weight of a dispersion of an ethyl-styrol/acrylate/butyl-acrylate-copolymer.

According to the state of the art, since the end of the eighties, a pre-impregnated product has been known, from marketing efforts, which is obtained by impregnating a basic paper of a cellulose mixture of long- and short fibers with an impregnation solution known according to internal identification R20. The impregnated solution contains 15% of a glyoxal/urea-precondensate or -resin in watery solution, 57% of a 50% watery dispersion of a copolymer on basis of n-butylacrylate and styrol and 28% water. The pre-impregnate has various desirable properties, such as for example, high resistance toward hardening and abrasion, high temperature resistance, color-fast property, neutral natural color, excellent resistance to water, as well as excellent resistance to chemicals, high degree of flame-resistance, high optical transparency, is devoid of odor and taste, as well as toxicologically completely harmless. Specifically involved is a low formaldehyde pre-impregnate. However, when unfavorable temperatures and varnish systems are combined, it is not sufficiently stable with respect to turning yellow.

The term “turning yellow” shall not mean, in this case, insufficient light resistance, but the chemical reaction which occurs based on the employed impregnation solution. The known pre-impregnate finds little application in the so-called “white” sector due to said yellowing. The skilled person understands by “white” sector, light-colored laminates or pieces of furniture, where turning yellow has a particularly detrimental effect.

SUMMARY OF THE INVENTION

The invention was, therefore, based on the object to provide a pre-impregnate that has all the desirable properties of the above-described pre-impregnate, but, at the same time, shows no tendency toward turning yellow.

According to the invention, said object is solved with a method which is characterized in that a base paper is impregnated with an impregnation solution, which contains a) a watery dispersion on basis of an acrylic acid ester/styrol copolymer, b) a dry-hardener on basis of a copolymerisate of (meth-)acrylamide and (meth-)acrylic acid and c) water, whereby per dry weight part of dry copolymerisate from (methacrylamide and (meth-)acrylic acid, approximately 0.3 to 13 parts by weight of dry acrylic acid ester/styrol-copolymer are used.

DETAILED DESCRIPTION OF THE PREFERRED EMBODIMENTS

The designation “pre-impregnate” involves a technical term known to the expert. The pre-impregnate is obtained, as mentioned above, by impregnation of basic paper with an impregnation solution. It is subsequently dried. It is then present in the form of resin-soaked fiber material - in the language of trade also called “foil” - and is sold in this form on the market. Depending upon required end use, it may be further modified.

It is preferred, within the scope of the invention, that per weight part of copolymerisate from (meth-)acrylamide and (meth-)acrylic acid, approximately 1 to 9 parts by weight, specifically approximately 3 to 7 parts by weight are used of acrylic acid ester/styrol-copolymer. The last named sector has the advantage that a product is obtained which is low in formaldehyde, flexible and resistant with respect to turning yellow.

The pH value of the employed impregnation solution lies preferably within the range of approximately 4.5 to 8.0, specifically within the range of approximately 5.0 to 5.5. Adjustment of desired pH value can be done with soda lye and sulphuric acid or hydrochloric acid. Too high a pH value may lead to instability of the dispersion, too low a pH value may result in potential fiber damage.

The viscosity (measured according to DIN 53211) of the impregnation solution should amount to approximately 10 to 18 seconds, specifically approximately 11 to 14 seconds.

The solid matter contents of the impregnation solution lies, depending upon the application product, in the range of approximately 15 to 50 percent by weight. A solid matter contents of approximately 30 percent by weight is preferred, since this will achieve a desirable impregnation degree of the fibrous fabric.

With respect to the acrylic acid ester of the acrylic acid ester/styrol-copolymer, this may involve ethyl-, n-butyl-, i-butyl- and 2-ethylhexylester, with employment of n-butylacrylate being preferred.

The commercial product Acronal S 305 $D^R$ from BASF Aktiengesellschaft has proven itself as particularly suitable. Acronal S 305 $D^R$ is a 50% watery dispersion of a copolymer on basis of a n-butylacrylate and styrol.

In the pre-impregnate, the acrylic acid ester/styrol copolymer is present in form of a film. The minimum film forming temperature lies preferably within the range of approximately 5 to 70° C., specifically within the range of approximately 10 to 30° C.

The dry hardener preferably involves a copolymerisate of acrylamide and acrylic acid with anionic charge. In comparison with a dry hardener on the basis of a copolymersate of methacrylamide and methacrylic acid with anionic charge, the use of a copolymerisate on the basis of acrylamide and acrylic acid leads to less brittle products.

The dry hardener itself has a solid matter content of approximately 15 to 30%, specifically of approximately 20 to 22%, a pH value in the range of approximately 6.0 to 9.0, a viscosity of approximately 100 to 300 mpa.s (Brookfield; 20° C.), and also a density of approximately 1.0 g/rl at 20° C.

In conformity with the analysis, the dry hardener is to be introduced into the paper mass in order to develop the hereinafter described properties. Since the dry hardener forms polymer bridges, it hardens the paper structure without interfering with the sheet forming or affecting the porosity. That means that all firmness properties of the paper are improved. Depending upon application volume and type of paper, one achieves improvements in the breaking length and points per pound as well as in the tear growth resistance and the interlaminar strength of the paper. This permits, depending upon the requirements with respect to quality, the use of cost-effective raw materials, higher ash contents of the basic paper and savings in auxiliaries. Significant improvement in retention is a further side effect.

Long and short cellulose fibers may be employed as basic fibrous materials. The material texture of the base paper before impregnation does not significantly differ from that of the decoration papers. Long fiber portion amounts to approximately 4 to 40%, specifically approximately 15 to 30%, the short fiber portion to approximately 60 to 100%, specifically approximately 60 to 85%. Milling degree of base paper is likewise variable and ranges between 18 and 50° SR, specifically between 25 and 35° SR. Ash contents of base paper, depending upon the respectively employed paper, lies between approximately 2 to 40%, specifically between approximately 10 to 30%. The settings in the paper machine, such as speed, wet press imprint, temperature curve, contact pressure at Yankee drier differ according to type and quality of the employed paper and are altered and optimized within the scope of paper manufacturing requirements. For control of retention, after-break loads and pH value, commercially available products are used, such as aluminum sulfate.

In some cases it may be of benefit to add property-modifying additives to the impregnation solution, such as pH regulators, wet and dry strength materials, synthetic resin dispersions, precipitants (fasteners), tensides, dyes, fillers, hardening regulators, viscosity regulators, anti-adhesion and penetration auxiliaries, as well as pigments.

Impregnation of the base paper for the impregnate is performed with a paper impregnation installation. This involves an arrangement of various machine components, such as unwinding unit, glue press, drier section, steam moistener, calender and paper roll winder.

The pre-impregnate may be produced according to the so-called "on-line" as well as according to the "off-line" operating mode. "On-line" means that the glue press, with which the impregnation solution is applied, is located inside the paper machine, whereas the meaning of "off-line" signifies that the glue press is used in a separate operating step behind or following the paper machine. In the case of the latter, the pre-impregnate is not present as finished product at the end of the paper machine, but as semi-finished product. The result is that important parameters, such as color, porosity, smoothness and final surface weight must either be subsequently adjusted in the laboratory or, based on experience, be re-calculated.

The impregnation solution may be applied on one side, but also on both sides of the base paper. If the impregnation solution is applied on one side, then the design of the surface of the screen side of the base paper is of importance, and to that end, control of the temperature curve of the pre-drying group of the paper machine is extremely important. With dual-sided impregnation, full impregnation may be performed, i.e., the entire paper mass may be impregnated. Total absorption volume of impregnation solution by the base paper depends upon the type of base paper, but it also depends upon the type of evacuation pressing of the excess impregnation solution from the paper width. Basic requirements for amount of impregnation solution introduced into the base paper are approximately 15 to 30% resin percentage, preferably approximately 18 to 27% resin percentage, with two-sided impregnation. There is no uniform impregnation. In the center there is, accordingly, a lesser concentration than in the surface region.

In contrast to the initially described pre-impregnate, the pre-impregnate according to the invention has the benefit that it will not result in a yellowing of the machining products. This attributable to the circumstance that the component of the gluoxal/urea pre-condensate was replaced by a dry hardener on the basis of a copolymerisate from (meth)acrylamide and (meth)acrylic acid with weak anionic charge. The dry hardener is customarily added to the mass and physically results in a strengthening of the fibers, which improves the dry strength of the dry product, but does not improve the wet strength. This is an indication that the dry hardener acts only by physically pasting the fibers together and that the fiber structure is not strengthened via chemical reaction.

The pre-impregnate according to the invention may be employed to produce decorative compound structures. Decorative laminates may, for example, be fabricated with the pre-impregnate according to the invention. They are produced in presses or gluing plants, under application of heat and pressure and suitable gluing systems. Particle board sheets and medium-dense fiber-board sheets (MDF-sheets) are specifically coated with the pre-impregnate according to the invention. The pre-impregnate also serves as decoration carrying component.

In the manufacture of furniture, wood-working materials on particle board basis are used in great volume. The optically often unattractive surface of these woodworking materials and their limited consumption value necessitates the employment of laminating materials. The pre-impregnate according to the invention offers itself for said purpose. The foil according to the invention may have any chosen wood grain or any chosen imaginative decoration. The pre-impregnate may be varnished in an additional operating step. Transparent varnishes find specific application, such as, for example, acrylate varnishes, acid-hardening, water-soluble and pigmented varnishes. In addition to its protective function, the varnish also lends the appropriate optical impression to the pre-impregnate.

In the following, the invention is being explained in more detail, based on examples:

EXAMPLE

Base paper having the following composition was produced according to the invention: 20% pine sulfate cellulose and 80% eucalyptus cellulose. Degree of milling amounted to 31° SR (Schopper-Riegler). The following additions were made to the cellulose: 30% titanium dioxide and 4% formaldehyde-free wet solid material.

This base paper, having a surface weight of 50 g/m$^2$ was impregnated with the impregnation solution according to the invention at a ratio of 7:1, in a glue press, on both sides, and the required solid matter contents was adjusted with water.

| Properties | | Impregnated Base Paper | | | |
|---|---|---|---|---|---|
| Formula | | 1 | 2 | 3 | 4 |
| water resistance | | OK | poor | good | good |
| split resistance | | poor | poor | OK | OK |
| color difference | dL | −0.6 | −0.4 | −0.6 | −2.2 |
| Cie. Lab.* | da | −0.2 | −0.1 | −0.1 | 0.4 |
| | db | 2.9 | 1.4 | 1.5 | 6.2 |
| | dE | 3.0 | 1.5 | 1.6 | 6.6 |

*Color differences were determined as follows:

Part of the respective foil is exposed to 200° C. for 2 minutes. Subsequently thereto, the color coordinates Cie Lab (light category D65 without sheen) are determined:

a) of the untreated part of the foil b) of the heat-treated part of the foil

This then results in the color differences—dL =(brightness shifting), da=(red-green shifting), db=(blue-yellow shifting), and dE=(full color shifting) of the heat-treated foil vis-a-vis the untreated foil.

Recipes:

1) Dispersion alone (acrylic acid ester/styrol-copolymer), diluted to 30% solid matter contents.

2) Dry Hardener alone (acrylamide/acrylic acid), diluted 10% solid matter content.

3) Impregnation solution according to the invention, consisting of dispersion (recipe 1) and Dry Hardener (recipe 2) at a ratio of 7:1 diluted with water to 30% solid matter contents.

4) Recipe with Glyoxal/urea resin and dispersion.

It is apparent from the above table that the dispersion alone presents poor splitting resistance. The dry hardener alone develops too little resistance to water and has tendency toward poor resistance to splitting, the same as recipe 4. However, the impregnation solution 3, in contrast to recipe 4, shows clearly lesser yellow shifting (db value) after heat treatment.

What is claimed is:

1. A pre-impregnate solution, comprising a base paper and an impregnation solution impregnated in said base paper, said impregnate solution comprising a) a water dispersion comprised of an acrylic acid ester/styrene copolymer, b) a dry hardener copolymerisate comprised of (meth) acrylamide and (meth)acrylic acid and c) water, wherein about 0.3 to 13 parts by weight dry acrylic acid ester/styrene copolymer are present per part dry hardener, and wherein the pH-value of the impregnation solution is adjusted to approximately 4.5 to 5.5.

2. A pre-impregnate product comprising paper impregnated with a solution comprising: a) a water dispersion of an acrylic acid ester/styrene copolymer, b) a dry hardener comprised of a copolymerisate of (meth)acrylamide and (meth)acrylic acid and c) water, wherein said dry acrylic acid esteristyrene copolymer comprises about 0.3 to 13 parts by weight per part dry hardener, and the pH-value of the impregnate solution is approximately 4.5 to 5.5.

3. The pre-impregnate product of claim 2 comprising decorative compound structures.

4. The pre-impregnate product of claim 2 comprising decorative laminates.

5. The pre-impregnate product of claim 2 comprising particle board sheets.

6. The pre-impregnate product of claim 5 comprising furniture.

* * * * *